United States Patent [19]

Roberts

[11] Patent Number: 4,541,160
[45] Date of Patent: Sep. 17, 1985

[54] PROCESS OF USING A FLEXIBLE SHAFT MOTOR COUPLING HAVING INTERCHANGEABLE ADAPTORS

[76] Inventor: Thomas C. Roberts, 4 Cloverly Rd., Somerset, N.J. 08873

[21] Appl. No.: 403,375

[22] Filed: Jul. 30, 1982

Related U.S. Application Data

[62] Division of Ser. No. 237,306, Feb. 23, 1981, abandoned.

[51] Int. Cl.⁴ .................. B22D 19/10; B23P 6/00
[52] U.S. Cl. ........................... 29/401.1; 29/428; 403/359; 403/361; 464/52; 464/162; 464/182
[58] Field of Search ................. 29/428, 401.1, 434; 464/52, 53, 57, 162, 182, 183; 403/359, 361

[56] References Cited

U.S. PATENT DOCUMENTS

| | | | |
|---|---|---|---|
| 1,775,402 | 9/1930 | Mandl | 81/177 R |
| 2,319,409 | 5/1943 | Latimer | 464/183 X |
| 2,704,005 | 3/1955 | Clayson | 464/57 |
| 2,869,907 | 1/1959 | Deliso | 403/359 |
| 2,917,909 | 12/1959 | Josutis | 464/183 X |
| 3,440,836 | 4/1969 | Petersen | 464/53 |
| 3,481,156 | 12/1969 | De Csipkes | 464/52 |

FOREIGN PATENT DOCUMENTS

| | | | |
|---|---|---|---|
| 0612983 | 5/1935 | Fed. Rep. of Germany | 464/52 |
| 2455042 | 6/1975 | Fed. Rep. of Germany | 81/177 G |
| 0943437 | 12/1963 | United Kingdom | 464/57 |

*Primary Examiner*—Charlie T. Moon
*Assistant Examiner*—Ronald S. Wallace

[57] ABSTRACT

A system is disclosed wherein a rotatable flexible shaft is capable of coupling one of several driving members to one of several driven members. The output shafts of the driving members may be of different sizes as well as the input shafts of the driven members. The flexible shaft is of standard length and diameter and is provided with conventional integrally formed squares at each end thereof. Each integrally formed square is slidingly received by an adapter having a mating hollow square at one of its ends. The other end of each adapter is provided with a bore of varying sizes which bores are capable of receiving any of the output and input shafts of varying sizes. The flexible shaft free floats in the mating hollow squares of the adapters.

1 Claim, 1 Drawing Figure

PROCESS OF USING A FLEXIBLE SHAFT MOTOR COUPLING HAVING INTERCHANGEABLE ADAPTORS

This application is a division, of application Ser. No. 237,306, filed Feb. 23, 1981, now abandoned.

STATEMENT OF THE INVENTION

This invention relates to flexible shafts and more particularly to a method enabling the same flexible shaft to be used for coupling any one of many driving members to any one of many driven members wherein the members may have output and input shafts respectively of varying sizes.

BACKGROUND AND SUMMARY OF THE INVENTION

Flexible shafts comprise basic elements of power transmission and are designed to transmit power or control from a driving element to an element to be driven. Transmission may be over, under, or around obstacles or objects where transmission by solid shafts would be impractical or impossible.

In a typical rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, metallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high speed operation in one direction. Remote control flexible shafts, on the other hand, are designed primarily for hand-operated control in either direction.

Power driven flexible shafts have two general classes of application—those in which there is relative movement between the driving and driven elements, and the curvature and twisting of the shaft is continually changing, as when, for example, a driven element such as a portable grinding tool is continuously moved about the workpiece by an operator and those in which the shaft operates in a given position and the curve, or curves, of the shaft remain substantially fixed, as in the coupling arrangement of the present invention wherein a shaft is used to transmit torque from a motor to a pump, or motor to a blower, for example. In a typical arrangement of this type, a fitting is permanently affixed to each end of the flexible shaft and the fitting suitably respectively connected to the output shaft of the motor and input shaft of the driven member.

Such practice necessitates an inventory of a rather large number of flexible shafts in order that (a) coupling torque requirements between the driving and driven members may be readily satisfied, and (b) the permanent fittings at the flexible shaft ends will, in all likelihood be compatible with the various sizes of shafts of the driving and driven members.

The present invention permits a much smaller inventory of flexible shafts to be stocked and yet each of the inventoried shafts may be used to couple any one of several driving members to any one of several driven members.

Briefly, a flexible shaft is provided with integrally-formed, polygonally-shaped ends, preferably square, which are slidingly, free-floatingly received by adapters having bores at their other ends of different sizes. Thus, a torque conveying coupling system is described herein wherein the same flexible shaft may be used between one of a plurality of driving members and one of a plurality of driven members, each of the members having identical or different size shafts by merely, if necessary, selecting adapters with proper bore sizes.

DETAILED DESCRIPTION OF THE INVENTION

Figure 1:
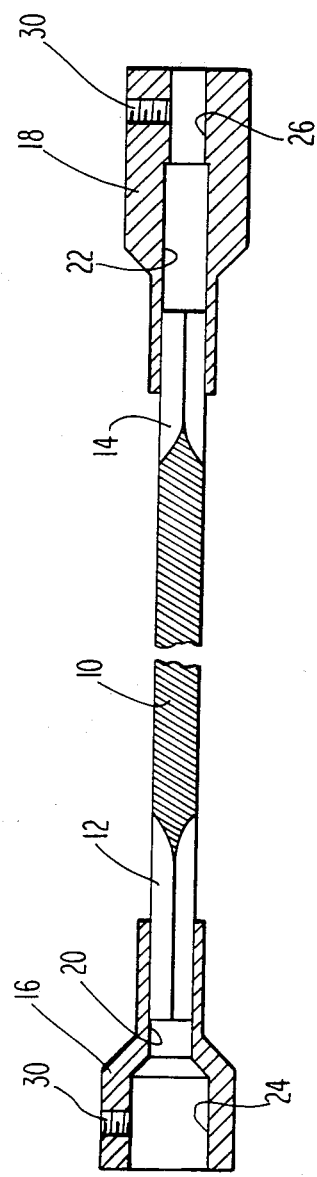
FIG. 1, the sole figure of the drawing, is a longitudinal sectional view of an embodiment of the flexible shaft coupling arrangement of the present invention.

In FIG. 1, a rotatable flexible shaft 10 of standard length and diameter is provided with conventional integrally formed, polygonally-shaped ends 12 and 14, preferably square. Adapters 16 and 18 slidingly matingly receive ends 12 and 14 respectively in free-floating relationship. That is, adapters 16 and 18 are provided with mating hollow squares 20 and 22 of sufficient length to permit integrally formed squares 12 and 14 respectively to free float therein to thereby compensate for expansion or contraction of the shaft due to temperature changes or slight relative movement of either driving or driven members. Slight helixing of the flexible shaft is also accommodated by this free-floating capability.

Adapters 16 and 18 are provided with bores 24 and 26 respectively which respectively receive the output shaft of a motor (not shown) and input shaft of a driven member, suitably a pump or blower (also not shown). The adapters may each be provided with a threaded hole 30 for receiving a set screw (not shown) to secure the adapters to their respective shafts.

Thus, when a coupling between a motor and a pump or blower, for example, is to be field assembled from a standard flexible shaft of standard length and diameter, it becomes necessary only to select adapters having the proper bore sizes.

I claim:

1. A method of coupling a second driving member to a second driven member by means of a rotatable flexible shaft therebetween wherein said flexible shaft is coupling a first driving member to a first driven member, each of said second and first driving members having an output shaft of different size and each of said second and first driven members having an input shaft of different size, said flexible shaft having both ends thereof provided with integrally formed squares and wherein said first driving member and flexible shaft are connected by a first adapter having a bore at an outer end thereof for receiving output shaft of said first driving member and a hollow square at its inner end for matingly slidingly receiving an end of said flexible shaft, and said first driven member and flexible shaft are connected by a second adapter having a bore at an outer end thereof for receiving input shaft of said first driven member and a hollow square at its inner end for matingly slidingly receiving other end of said flexible shaft, the steps comprising removing said first and second adapters from said flexible shaft and shafts of said first driving and driven members, replacing said first and second adapters with third and fourth adapters respectively on said flexible shaft, said third adapter having a bore at its outer end for receiving output shaft of said second driving member and said fourth adapter having a bore at its outer end for receiving input shaft of said second driven member, and securing said third adapter to said output shaft of said second driving member and said fourth adapter to said input shaft of said second driven member.

* * * * *